United States Patent
Prestidge

[11] Patent Number: 6,051,111
[45] Date of Patent: Apr. 18, 2000

[54] COLD DISTILLATION METHOD

[76] Inventor: D. Joshua Prestidge, 6370 W. Arter St., Crystal River, Fla. 33429

[21] Appl. No.: 09/305,399

[22] Filed: May 5, 1999

[51] Int. Cl.⁷ ..................................................... B01D 3/10
[52] U.S. Cl. ................................ 203/11; 203/10; 203/91; 203/100; 159/DIG. 1; 159/DIG. 16; 159/DIG. 26; 159/900; 159/901; 202/205
[58] Field of Search ................................. 203/10, 11, 91, 203/100; 331/1; 219/209; 159/DIG. 16, DIG. 26, 174, DIG. 1, 29, 900, 901; 392/325, 387; 202/205, 233

[56] References Cited

U.S. PATENT DOCUMENTS

| | | | |
|---|---|---|---|
| 1,177,819 | 4/1916 | McIntrye . | |
| 1,854,475 | 4/1932 | Littlefield | 159/DIG. 26 |
| 2,362,889 | 11/1944 | Darrah | 159/DIG. 26 |
| 3,317,405 | 5/1967 | Brown | 159/900 |
| 3,904,392 | 9/1975 | Van Ingen et al. | 159/900 |
| 4,323,424 | 4/1982 | Secunda et al. . | |
| 4,571,484 | 2/1986 | Singfield . | |
| 4,735,722 | 4/1988 | Krepak . | |
| 4,891,140 | 1/1990 | Burke, Jr. . | |
| 5,094,758 | 3/1992 | Chang . | |
| 5,110,479 | 5/1992 | Fommer et al. . | |
| 5,160,634 | 11/1992 | Chang . | |
| 5,229,005 | 7/1993 | Fok et al. . | |
| 5,525,200 | 6/1996 | LaNois et al. . | |
| 5,565,067 | 10/1996 | Chaffin, III | 203/10 |
| 5,630,913 | 5/1997 | Tajer-Ardebili . | |
| 5,638,003 | 6/1997 | Hall . | |
| 5,653,852 | 8/1997 | Meng | 203/100 |
| 5,679,254 | 10/1997 | Chakrabarti . | |

FOREIGN PATENT DOCUMENTS

| | | | |
|---|---|---|---|
| 0125375 | 2/1945 | Australia | 159/DIG. 26 |
| 137758 | 11/1947 | Australia | 159/DIG. 26 |
| 3324876 | 1/1985 | Germany | 203/10 |
| 4036437 | 5/1992 | Germany | 203/10 |
| 1194987 | 8/1989 | Japan | 203/10 |
| 055167 | 3/1994 | Japan | 203/10 |
| 1599033 | 10/1990 | U.S.S.R. | 159/DIG. 26 |
| 1722515 | 3/1992 | U.S.S.R. | 159/DIG. 26 |
| 582575 | 11/1946 | United Kingdom | 159/DIG. 26 |

*Primary Examiner*—Virginia Manoharan
*Attorney, Agent, or Firm*—Smith and Hopen, P.A.; Anton J. Hopen

[57] ABSTRACT

A method of distillation having the steps of drawing a volume of untreated water containing impurities into a container, applying a vacuum to the container, applying an oscillating electric charge to the untreated water thereby producing water vapor from the untreated water, capturing the water vapor in a vapor pipe, and condensing the water vapor back into a liquid form in a collecting chamber. An oscillating frequency of 2.6 gigahertz, either by sonic or electric charge, displaces the hydrogen bonding between water molecules. This displacement permits distillation at a low temperature without the infusion of large amounts of energy common in previously known methods.

8 Claims, 3 Drawing Sheets

COLD DISTILLATION METHOD

RELATED APPLICATIONS

Reference is made to U.S. patent application Ser. No. 08/953,183, abandoned, entitled: Desalination Method Using Induced Molecular Displacement, and filed in the name of D. J. Prestidge on Oct. 17, 1997.

FIELD OF INVENTION

The present invention relates generally to a distillation process and more specifically to a method for obtaining potable water from saltwater.

BACKGROUND OF THE INVENTION

Water is an immeasurably valuable resource to the human race. However, 97.23 percent of all water is found in the oceans. About one percent of the freshwater is in the glaciers and ice caps and about one percent is in the atmosphere and clouds. This leaves only one percent in the ground available from aquifers and natural springs.

Because of its capacity to dissolve numerous substances in large amounts, pure water rarely occurs in nature. During condensation and precipitation, rain or snow absorbs from the atmosphere varying amounts of carbon dioxide and other gases, as well as traces of organic and inorganic material. In addition, precipitation carries radioactive fallout to the earth's surface. In its movement on and through the earth's crust, water reacts with minerals in the soil and rocks. The principal dissolved constituents of surface and groundwater are sulfates, chlorides, and bicarbonates of sodium and potassium and the oxides of calcium and magnesium. Surface waters may also contain domestic sewage and industrial wastes. Groundwaters from shallow wells may contain large quantities of nitrogen compounds and chlorides derived from human and animal wastes. Waters from deep wells generally contain only minerals in solution.

Seawater contains, in addition to concentrated amounts of sodium chloride, or salt, many other soluble compounds, as the impure waters of rivers and streams are constantly feeding the oceans. At the same time, pure water is continually lost by the process of evaporation, and as a result the proportion of the impurities that give the oceans their saline character is increased.

In their thirst for water, people have looked longingly throughout history at the endless supply of water from the sea. More than ever, people believe that desalting ocean water holds the answer to the ever-increasing demand for fresh-water. In 1967, Key West, Fla., began operation of its desalination plant and thus became the first city in the United States to draw its fresh water from the sea.

Desalination plants have high construction costs and consume large amounts of power. Using conventional fuels, plants with a capacity of 1 million gallons per day or less produce water at a cost of $1.00 or more per 1,000 gallons. More than 500 such plants are in operation with a total capacity of nearly 125 million gallons a day. Natural freshwater sources cost only 30 cents per 1,000 gallons, yet rapidly deplete underground aquifers and other relatively finite sources of freshwater.

Further problems with desalination plants in current operation are their environmental effect. These plants produce a brine effluent that threatens the aquatic environment when returned to the sea.

Other drawbacks to current desalination plants are their limitations to treating seawater. What is needed is a method to produce distilled quality freshwater from wastewater. However, traditional distillation processes heat the water, thereby vaporizing objectionable organic or toxic content.

Currently utilized distillation methods include multiple-effect evaporation, vapor-compression distillation, and flash evaporation. The typical distillation process comprises heating the influent saltwater until it boils. This separates out the dissolved minerals resulting in a purified and salt-free product. This product is then recovered in a gaseous state and piped out to the distribution system.

Other desalination methods include freezing, reverse osmosis and electrodialysis. The freezing process takes advantage of the different freezing points of fresh and salt water. The ice crystals are divided from the brine, washed free of salt, and melted into fresh water. Reverse osmosis comprises the process of using pressure to force fresh water through a thin membrane that does not permit the minerals to pass. Electrodialysis is applied to recovering fresh water from brackish waters. Positive and negative ions are created when a salt dissolves in water. An electric current is applied to the water through anion and cation membranes which extract the salt from the solution.

Water exhibits constancy in all its phases (liquid, gas, and solid). This constancy is perceptible in the temperature change of liquid water which increases or decreases more slowly than almost any other known material. Water takes ten times the energy of iron (for equal weight) to heat one degree. This slow heating of water acts as a buffer against accelerated boiling or burning.

Inhibiting the hydrogen-bonding of liquid water requires the displacement of water molecules at the point of bonding flickering on and off at a frequency of approximately one billion times a second. The bonding is dependent on position. The molecules must be oriented with a hydrogen atom in one molecule close to an oxygen atom in another. A displacement in this configuration would inhibit the bond from forming. A frequency of one billion hertz has a wavelength of one micrometer which is approximately the same length of one thousand water molecules in a linear arrangement. These molecules are displaced during the compression and relaxation of the wave motion thereby preventing the bonds from establishing. Without the hydrogen-bonding, the liquid water boils at room temperature. Once the vapor is no longer subjected to the high-frequency oscillations, it condenses back to a liquid.

This invention is direct to a new method of desalination which utilizes molecular displacement to vaporize water from contaminants without the need to heat the solution.

An object of this invention is to provide an alternate method of desalination of seawater.

It is another object of this invention to provide desalination at a lower cost than previously known methods by lowering the energy level required to minimal amounts.

It is another object of this invention to provide distilled water from seawater regardless of the water's salinity.

It is another object of this invention to provide potable water from seawater without creating environmental damage from the brine effluent common to methods previously known.

It is another object of this invention to provide a system of water treatment to produce potable water from other contaminated solutions other than seawater.

Previous attempts have been made to provide an efficient desalination process such as described in U.S. Pat. No. 5,679,254 to Chakrabarti ('254 patent); U.S. Pat. No. 5,630, 913 to Tajer-Ardebili ('913 patent); U.S. Pat. No. 5,525,200 to LaNois et al. ('200 patent); U.S. Pat. No. 5,229,005 to Fok et al. ('005 patent); U.S. Pat. Nos. 5,160,634 and 5,094,758 to Chang ('634 and '758 patents); all of which are incorporate herein by reference.

The '254 patent to Charkrabarti describes the desalination of seawater by applying organic chemicals to seawater which bond to the water molecules. The new solution is then heated to extract and recover fresh water. However, this process requires the use of chemicals and is limited in output capacity. Furthermore, the solution recovered by the process it not completely salt-free.

The '913 patent to Tajer-Ardebili describes a water distillation system using relatively standard methods of heat, vacuum and condensation. The '913 patent provides no mechanism to further reduce the boiling point of the liquid aside from the application of a vacuum.

The '200 patent to LaNois et al. describes a low temperature vacuum distillation apparatus wherein a vacuum applied to untreated liquid lowers the boiling point so that distillation may occur at lower temperatures. The perceived benefit of the '200 patent is its baffleless pathway to provide a more efficient vapor collection process. However, the '200 patent provides no mechanism to further reduce the boiling point of the liquid aside from the application of a vacuum.

The '005 patent to Fok et al. describes a process for desalination of seawater utilizing the oceanic depth as a source for pressure for reverse osmosis. However, the water must be repeatedly transferred from an oceanic depth to the surface and then transported inland. Furthermore, this process is impractical for many coastal communities wherein the ocean depth is too shallow in the surrounding vicinity.

The '634 and '758 patents to Chang describe a system and method for desalinating water utilizing a laser beam to reduce the dielectric value of the solvent and vibrating the ions, permitting them to combine and precipitate out of seawater. However, the '634 patent requires the use of expensive lasers and related optics to function properly. Additionally, the '634 patent may not be suitable for large desalination projects.

Consequently, there is a need in the art for an alternate method of desalination of seawater.

There is a further need in the art for a desalination process which operates at a lower cost than previously known methods by lowering the energy level required to minimal amounts.

There is a further need in the art for a water treatment process able to provide distilled water from seawater regardless of the salinity.

There is a further need in the art for a system that provides potable water from seawater without creating environmental damage from the brine effluent common to methods previously known.

There is a further need in the art for a system of water treatment to produce potable water from other contaminated solutions other than seawater.

There is a further need in the art for a system able to distill freshwater at a low temperature without vaporizing hazardous or undesirable contaminants.

However, in view of the prior art in at the time the present invention was made, it was not obvious to those of ordinary skill in the pertinent art how the identified needs could be fulfilled.

SUMMARY OF THE INVENTION

The present invention solves significant problems in the art by providing a low energy, environmentally benign method of distillation, particularly for desalinating seawater into potable water for human consumption.

A method of distillation comprising the steps of applying a vacuum to a body of water containing impurities, applying an oscillating electric charge to said water thereby producing a volume of water vapor from said water, and capturing and condensing said volume of water vapor.

Generally described, the present invention provides a method of distillation comprising the steps of applying a vacuum to a body of untreated water containing impurities, applying an oscillating electric charge to said untreated water thereby producing a volume of water vapor from said untreated water, and capturing and condensing said volume of water vapor. It is preferable that the vacuum be no less than 15 mm Hg or else the water will freeze. The oscillating electrical charge preferably operates at 15 volts root mean square ("RMS") of direct current and is applied between two or more electrodes. However, the desired effect may be obtained with any current provided its RMS is at least one volt. In a preferred embodiment, the electric current is oscillated at a frequency of 2.6 gigahertz with a minimum effective frequency of at least 0.9 gigahertz.

In a preferred embodiment, a body of untreated water containing impurities is drawn into a container before the oscillating electric charge is applied, the container is partially submerged in a body of untreated water containing impurities and having a base completely submerged in the body of untreated water, an opening in the base permits the circulation of the untreated water between the container and the untreated body of water. One problem that required resolution during the development of this invention was the thermal disparities between the untreated water and the resultant freshwater. When a significant vacuum is applied to the untreated water, it begins to freeze. At the same time, the resultant water vapor must cool in order to condense into a liquid. A collecting chamber receiving the water vapor via a vapor pipe from the container has a common wall to the container permitting thermal disparities between said container and said collecting chamber to equalize. Thus, both the latent heat energy of the body of water containing impurities and the heat from the recently condensed water vapor warms the cold, untreated water drawn to the top of the container and subjected to the vacuum. The common wall may be constructed of a non-insulating fluid impermeable material. It is also preferable that the container be partially submerged in the body of water containing impurities. An opening in the base of the container permits the circulation of water between the container and the body of water. As freshwater is extracted, the remaining salts and impurities are dissolved into the body of water, thereby preventing harmful levels of brine effluent or toxins to concentrate over an extended period of time.

A funnel may be utilized to facilitate the condensation of the vapor as its exists the vapor pipe. The condensed freshwater then falls into the collecting chamber.

It is anticipated that increasing the total freshwater output of this invention may be achieved by employing a plurality of individual units operating simultaneously. While each unit may require a separate oscillating electric charge, they may share a common vacuum source, thereby providing a more efficient and economical operation.

In an alternate embodiment, sonic displacement may be utilized to displace the water molecules. In this embodiment, a sonic wave oscillating at a frequency of at least 0.9 gigahertz, rather than the electric charge, is applied to the untreated water. The molecular effect is the same. However, utilizing an electric charge is preferable as sonic film transducers are less durable when subjected to continued high frequency operation.

An advantage of the invention is that desalination may be achieved at a lower cost than previously known methods by lowering the energy level required to minimal amounts.

Another advantage of this invention is that the process is achieved without raising the temperature of the untreated solutions, whether it is seawater, river water, waste water, or the like. By processing the water without the use of heat, harmful chemicals and undesirable substances are not vaporized into the atmosphere, thereby providing a substantial benefit to the environment.

Another advantage of this invention is its ability to provide potable water from seawater without creating environmental damage from the brine effluent common to other known methods.

Another advantage of this invention is its particular adaptability for communities near saltwater. Saltwater often contaminates freshwater aquifers as those aquifers are depleted. The current invention may be utilized directly off the coast of these communities, thereby providing a relatively limitless supply of needed freshwater with minimal energy requirements and low environmental impact.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
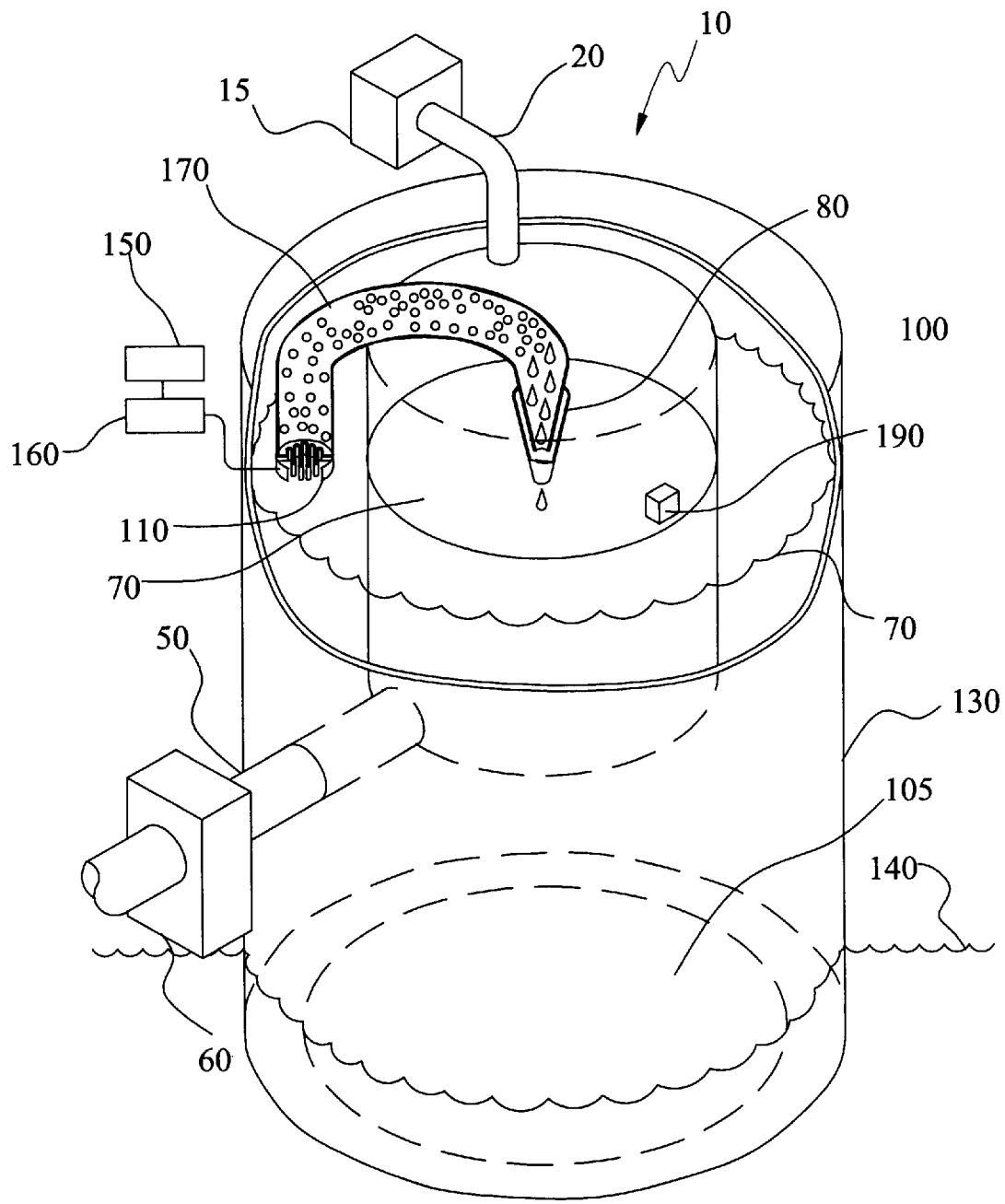
FIG. 1 is a perspective view of a preferred embodiment of the invention.

Referring initially to FIG. 1, it will there be seen that an illustrative embodiment of the present invention is denoted by the reference number 10 as a whole.

A container 130 is partial submerged in a body of untreated water 140. The container 130 has an opening 105 in its base which permits the circulation of the untreated water between the container 130 and the body of untreated water 140. Water is draw up into the container 130 from the body of untreated water 140. At the top of the container, an oscillating device 110 applies an oscillating electric charge to the surface of the untreated water. The electric charge is provided by a voltage source 150 and the oscillations are provided by an oscillator 160 coupled to the oscillating device 110. A vapor pipe 170 provides a pathway from the container to a collecting chamber 100. A vacuum pump 15 applies a vacuum to the collecting chamber 100 through a vacuum hose 20. The resulting vacuum is achieved within the container 130 through the vapor pipe 170.

The oscillating device 110 displaces the molecular bonds between the water molecules, thereby vaporizing the water in the container 130. The oscillator 160 preferably operates at a frequency of 2.6 gigahertz. The resultant vapor is drawn through the vapor pipe and exits through an opening 180 to the collecting chamber 100. Preferably, the resultant vapor strikes a funnel 80 as it falls through the opening 180, thereby condensing into liquid form of freshwater 70. A solenoid switch 190 affixed to an inner side of the collecting chamber 100 detects when the water level reaches a predetermined mark and a sump pump 60 then draws the freshwater 70 out an effluent pipe 50 for distribution as potable water.

It should be noted that in a preferred embodiment, the container 130 and the collecting chamber 100 share at least one common wall able to transfer heat energy. Thermal disparities between the untreated water and the resultant freshwater exist when a significant vacuum is applied to the water. The resultant freshwater begins to warm and the untreated water drawn to the top of the container begins to freeze. Therefore it is preferable to fashion a common wall between the container 130 and collecting chamber 100 so that the latent heat energy of a natural body of water and heat from the recently condensed water vapor warm the untreated water drawn to the top of the container and subjected to the vacuum. The common wall may be constructed of a non-insulating fluid impermeable material.

Figure 2:
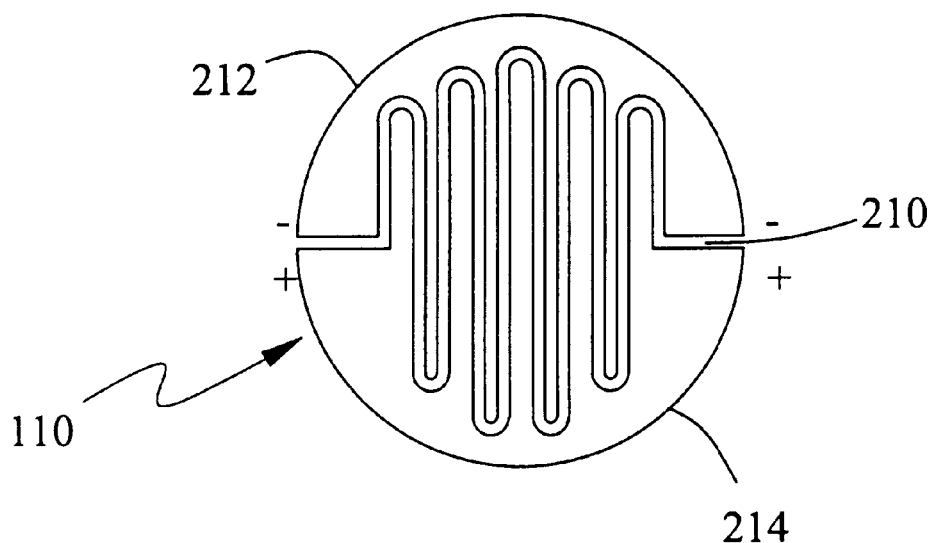
FIG. 2 is an overhead elevational view of a preferred embodiment of the oscillating device according to the invention.

FIG. 2 illustrates a perspective view of the oscillating device 110 adapted for use with an electric charge. In the illustrated embodiment, a first half 212 and a second half 214 have opposite electrical charges. A convoluted gap 210 provides a pathway for vapor production as oscillations in the electric charge displace the hydrogen bonds between the water molecules.

As an alternative embodiment, sonic displacement may be utilized to displace the water molecules. In this embodiment, a sonic frequency oscillating at a frequency of at least 0.9 gigahertz, rather than the electric charge, is applied to the untreated water. The molecular effect is the same. However, utilizing an electric charge is preferable as sonic film transducers are less resistant to continued high frequency operation.

Figure 2A:
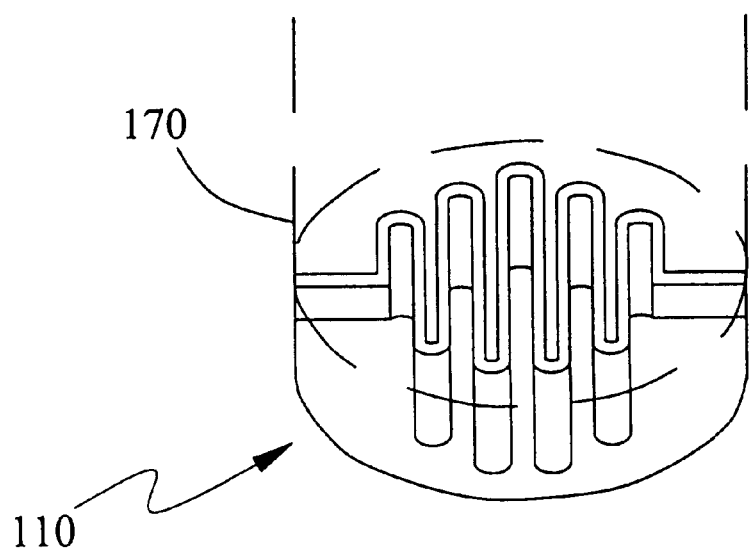
FIG. 2a is a perspective view of a preferred embodiment of the oscillating device according to the invention.

FIG. 2a shows a perspective view of the oscillating device 110 fitted to an end of the vapor pipe 170.

Figure 3:
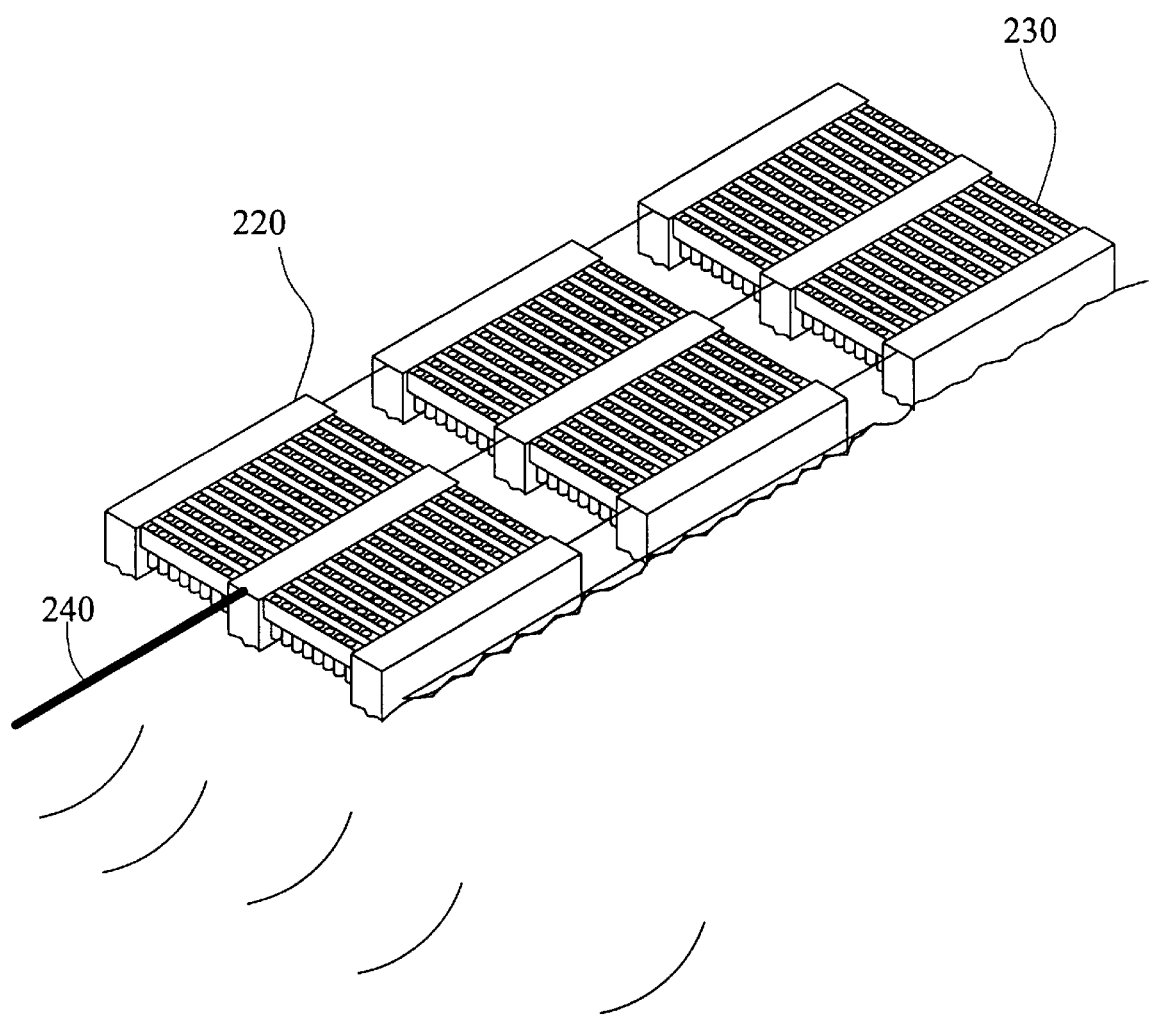
FIG. 3 is perspective view of a plurality of individual desalination units operating simultaneously off a beach.

FIG. 3 illustrates an intended use of the invention for high freshwater output from a coastal body of water. In the illustration an array 230 of the distillation units are suspended between floating barges 220. A freshwater pipe 240 provides a conduit from the coastal body of water to an inland population. While each unit may require a separate oscillating electric charge, they may share a common vacuum source, thereby providing a more efficient and economical operation.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method of distillation comprising the steps of:

applying a vacuum to a volume of untreated water containing impurities;

drawing said untreated water into at least one container partially submerged in a body of untreated water containing impurities and having a base completely submerged in said body of untreated water, an opening in said base permitting the circulation of said untreated water between said at least one container and said body of untreated water;

applying an oscillating electric charge to said untreated water thereby producing a volume of water vapor from said water; and capturing and condensing said volume of water vapor in a collecting chamber, said collecting chamber have a common wall to said at least one container permitting thermal disparities between said at least one container and said collecting chamber to equalize.

2. The method of distillation as in claim 1, wherein said water vapor is transferred from said at least one container to said collecting chamber via a vapor pipe.

3. The method of distillation as in claim 2, wherein water vapor exiting said vapor pipe strikes a funnel before condensing in said collecting chamber.

4. The method of distillation as in claim 1, wherein said at least one container is a plurality of containers each utilizing a separate oscillating electrical charge but sharing a common vacuum source.

5. A method of distillation comprising the steps of:

applying a vacuum to a volume of untreated water containing impurities;

drawing said untreated water into at least one container partially submerged in a body of untreated water containing impurities and having a base completely submerged in said body of untreated water, an opening in said base permitting the circulation of said untreated water between said at least one container and said body of untreated water;

applying an oscillating sonic wave to said untreated water thereby producing a volume of water vapor from said water; and capturing and condensing said volume of water vapor in a collecting chamber, said collecting chamber have a common wall to said at least one container permitting thermal disparities between said at least one container and said collecting chamber to equalize.

6. The method of distillation as in claim 5, wherein said water vapor is transferred from said at least one container to said collecting chamber via a vapor pipe.

7. The method of distillation as in claim 6, wherein water vapor exiting said vapor pipe strides a funnel before condensing in said collecting chamber.

8. The method of distillation as in claim 5, wherein said at least one container is a plurality of containers each utilizing a separate oscillating sonic wave but sharing a common vacuum source.

* * * * *